(12) United States Patent
Abe

(10) Patent No.: US 7,194,398 B2
(45) Date of Patent: Mar. 20, 2007

(54) METHOD AND APPARATUS FOR DESIGNING AND DEVELOPING A VEHICULAR DAMPER

(75) Inventor: Takeshi Abe, Garden City, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 848 days.

(21) Appl. No.: 10/063,037

(22) Filed: Mar. 13, 2002

(65) Prior Publication Data
US 2003/0176991 A1    Sep. 18, 2003

(51) Int. Cl.
G06G 7/48    (2006.01)
G01L 3/26    (2006.01)
G01M 15/00   (2006.01)
G06F 19/00   (2006.01)

(52) U.S. Cl. .................... 703/8; 703/7; 73/116; 701/58
(58) Field of Classification Search .................... 703/7, 703/8; 701/11, 53, 58; 702/56; 73/116
See application file for complete search history.

(56) References Cited

U.S. PATENT DOCUMENTS

| | | | | |
|---|---|---|---|---|
| 4,995,139 A | * | 2/1991 | Suzuki .................... 73/116 |
| 5,121,820 A | * | 6/1992 | Brown et al. ............... 192/3.3 |
| 5,195,038 A | * | 3/1993 | Yagi et al. .................... 73/116 |
| 5,521,824 A | * | 5/1996 | Eagan et al. ............... 701/101 |
| 5,771,482 A | * | 6/1998 | Rizzoni .................... 701/101 |
| 5,986,545 A | * | 11/1999 | Sanada et al. ............... 340/439 |
| 6,223,120 B1 | * | 4/2001 | Williams .................... 701/111 |
| 6,336,070 B1 | * | 1/2002 | Lorenz et al. ............... 701/102 |
| 6,578,411 B2 | * | 6/2003 | Cheng ........................ 73/118.1 |
| 6,634,218 B1 | * | 10/2003 | Nakanishi et al. ............. 73/116 |
| 6,651,493 B2 | * | 11/2003 | Myers et al. ............. 73/119 R |
| 6,865,466 B2 | * | 3/2005 | Voight et al. .................. 701/53 |
| 2002/0091471 A1 | * | 7/2002 | Suzuki ........................ 701/29 |

OTHER PUBLICATIONS

Burk, Phil. "Jsyn Tutorial: Generating Other Waveforms from the Sawtooth." © 1999. www.softsynth.com/jsyn/tutorial/other_osc.html.*
Sawtooth wave—from Wikipedia, the free encyclopedia. Printed on Aug. 30, 2005. http://en.wikipedia.org/wiki/Sawtooth_wave.*

(Continued)

Primary Examiner—Paul Rodriguez
Assistant Examiner—Ayal Sharon
(74) Attorney, Agent, or Firm—David B. Kelley; MacMillan, Sobanski & Todd

(57) ABSTRACT

An assembly 10 which allows a vehicular damper to be virtually created and evaluated. Particularly, the assembly 10 includes a torque producer 31, a frequency filter generator 50, and analyzers 32, 34, 36 and 38. The torque produce 31 selectively produces a torque signal which is combined with a selected frequency filter provided by the generator 50, thereby producing a dampened signal which is communicated to a transmission assembly 14. The analyzer detects noise and vibration and allows a designer to evaluate the chosen frequency filter. Other filters may be used and a filter is selected based upon the noise and vibration measurements made by the analyzers 32, 34, 36, and 38. An actual damper is then constructed having a frequency characteristic which is substantially similar to the frequency characteristic of the chosen frequency filter.

14 Claims, 3 Drawing Sheets

OTHER PUBLICATIONS

Weisstein, Eric W. "Sawtooth Wave." From Mathworld—A Wolfram Web Resource. © 1999-2005. http://mathworld.wolfram.com/SawtoothWave.html.*

Weisstein, Eric W. "Fourier Series—Sawtooth Wave." From Mathworld—A Wolfram Web Resource. © 1999-2005. http://mathworld.wolfram.com/FourierSeriesSawtoothWave.html.*

Aghili, F. et al. "Model-Matching Solution for Optimal Positive Joint Torque Feedback." Proc. 1997 IEEE/RSJ Int'l Conf. on Intelligent Robots and Systems. Sep. 11, 1997. vol. 1, pp. 157-161.*

Fellini, R. et al. "Optimal Design of Automotive Hybrid Powertrain Systems." 1999 Proc. EcoDesign '99. Feb. 3, 1999. pp. 400-405.*

Wipke, K. et al. "Advisor 2.0: A Second-Generation Advanced Vehicle Simulator for Systems Analysis." NREL/TP-540-25928, Mar. 1999.*

Wipke, K. et al. "Advisor 2.1: A User-Friendly Advanced Powertrain Simulation Using a Combined Backward/Forward Approach." IEEE Transactions on Vehicular Technology. Nov. 1999. vol. 48, No. 6, pp. 1751-1761.*

Dixon, W.E. et al. "Fault Detection for Wheeled Mobile Robots with Parametric Uncertain." Proc. 2001 IEEE/ASME Int'l Conf.on Adv. Intelligent Mechatronics, 2001. Jul. 12, 2001. vol. 2, pp. 1245-1250.*

Hong, K. et al. "A Load Compensation Scheme Under the Speed Measurement Delay." IEEE Transactions on Industrial Electronics. Apr. 1998. vol. 45, Issue 2, pp. 283-290.*

"PSAT Software Offers 'Real World' Hybrid Electric Vehicle Modeling." Argonne Nat'l Lab TransTech. Nov. 2001. http://transtech.anl.gov/v1n1/psat.html.*

"PSAT Technical Information." http://www.transportation.anl.gov/software/PSAT/tech_info.html. Undated. Printed on Aug. 30, 2005.*

"PSAT (Powertrain System Analysis Toolkit)." http://www.transportation.anl.gov/software/PSAT/. Undated. Printed on Aug. 30, 2005.*

"Powertrain System Analysis Toolkit (PSAT): A Flexible Reusable Model for Simulating Advanced Vehicles." http://www.techtransfer.anl.gov/docs/PSAT.pdf. Undated. Printed on Aug. 30, 2005.*

* cited by examiner

METHOD AND APPARATUS FOR DESIGNING AND DEVELOPING A VEHICULAR DAMPER

BACKGROUND OF INVENTION

1. Field of the Invention

The present invention generally relates to a method and an apparatus for designing and developing a vehicular damper and more particularly, to a method and an apparatus for efficiently and accurately simulating the operation of a vehicular damper in a manner which obviates the need for tangibly or physically creating the damper while efficiently allowing various different damper designs or configurations to be accurately evaluated and modified.

2. Background of the Invention

A vehicular damper, such as a clutch or a torque converter, is typically coupled to a rotating member, such as a crankshaft, and to a transmission assembly. More particularly, the vehicular damper is adapted to selectively transfer the torque from the crankshaft to the coupled assembly in a manner which is effective to desirably reduce the amount of vibration, and noise, (e.g., hereinafter sometimes referred to as "VN") which otherwise would be produced within the vehicle by such a transfer.

Particularly, a vehicular damper is typically designed or adapted to provide certain torque transmission or frequency response characteristics which are effective to provide the desired amount and type of dampening necessary to allow the foregoing transfer to desirably occur without substantial noise or vibration. Typically, various damper prototypes are physically or tangibly constructed and tested in order to ascertain the respective performance of these prototypes, thereby allowing a designer to evaluate certain damper designs and to gain further knowledge which aids in the creation of yet other damper prototypes and designs. The design process is further complicated by the use of many diverse types of engines, transmissions and other components which generally require unique types of dampers to achieve the foregoing desired benefits (e.g., each unique combination of these components may require a unique damper design).

Traditionally, each prototype is physically or tangibly created and tested by operatively placing the prototype within a vehicle and measuring the amount of noise and/or vibration which is produced during the previously delineated torque transfer. After such measurements are made, the data is evaluated and modifications are again made to the prototype and/or a new prototype is created and tested in the foregoing manner. This process continues until an acceptable damper design (i.e., one having a desired frequency response characteristic) is developed which substantially minimizes or reduces the amount of noise and vibration which is produced due to the torque transfer.

While the foregoing design process does allow for the creation of a desirable damper prototype, it is costly and is significantly time consuming due to the need to sequentially, individually, and physically construct and test each of the created damper prototypes.

There is therefore a need for a method and an apparatus for developing a vehicular damper in a manner which overcomes some or all of the previously delineated drawbacks of prior vehicular damper design and development strategies, techniques, and methodologies.

SUMMARY OF INVENTION

It is a first non-limiting advantage of the present invention to provide a method and an apparatus for designing and developing a vehicular damper in a manner which overcomes some or all of the previously delineated drawbacks associated with prior vehicular damper strategies, techniques, and methodologies.

It is a second non-limiting advantage of the present invention to provide a method and an apparatus for virtually designing and evaluating the performance of a vehicular damper.

It is a third non-limiting advantage of the present invention to selectively provide various types of torque signals which may be used to design and evaluate the performance of a vehicular damper in a virtual manner.

According to a first non-limiting aspect of the present invention, an assembly is provided which allows a damper to be virtually created.

According to a second non-limiting aspect of the present invention, an assembly is provided for use in combination with a vehicle of the type having a transmission assembly. The assembly comprises a damper simulator which is selectively coupled to said transmission assembly, which selectively generates a dampened signal, and which communicates the damper signal to the transmission assembly; and at least one analyzer which is coupled to the vehicle and which measures the reaction of the vehicle to the dampened signal which is communicated to the transmission assembly.

According to a third non-limiting aspect of the present invention, a method is provided for developing a vehicular damper comprising the steps of creating torque; providing a vehicle of the type having a transmission; providing a frequency filter generator; creating a first frequency filter by the use of the frequency filter generator; communicating the created torque to the frequency filter generator, thereby creating a dampened torque signal; coupling the dampened torque signal to the transmission; determining the response of the transmission to the receipt of the dampened torque signal; and creating a vehicular damper by the use of said determined response.

These and other features, aspects, and advantages of the present invention will become apparent upon a review of the following detailed description of the preferred embodiment of the invention and by reference to the following drawings.

DETAILED DESCRIPTION

Figure 1:
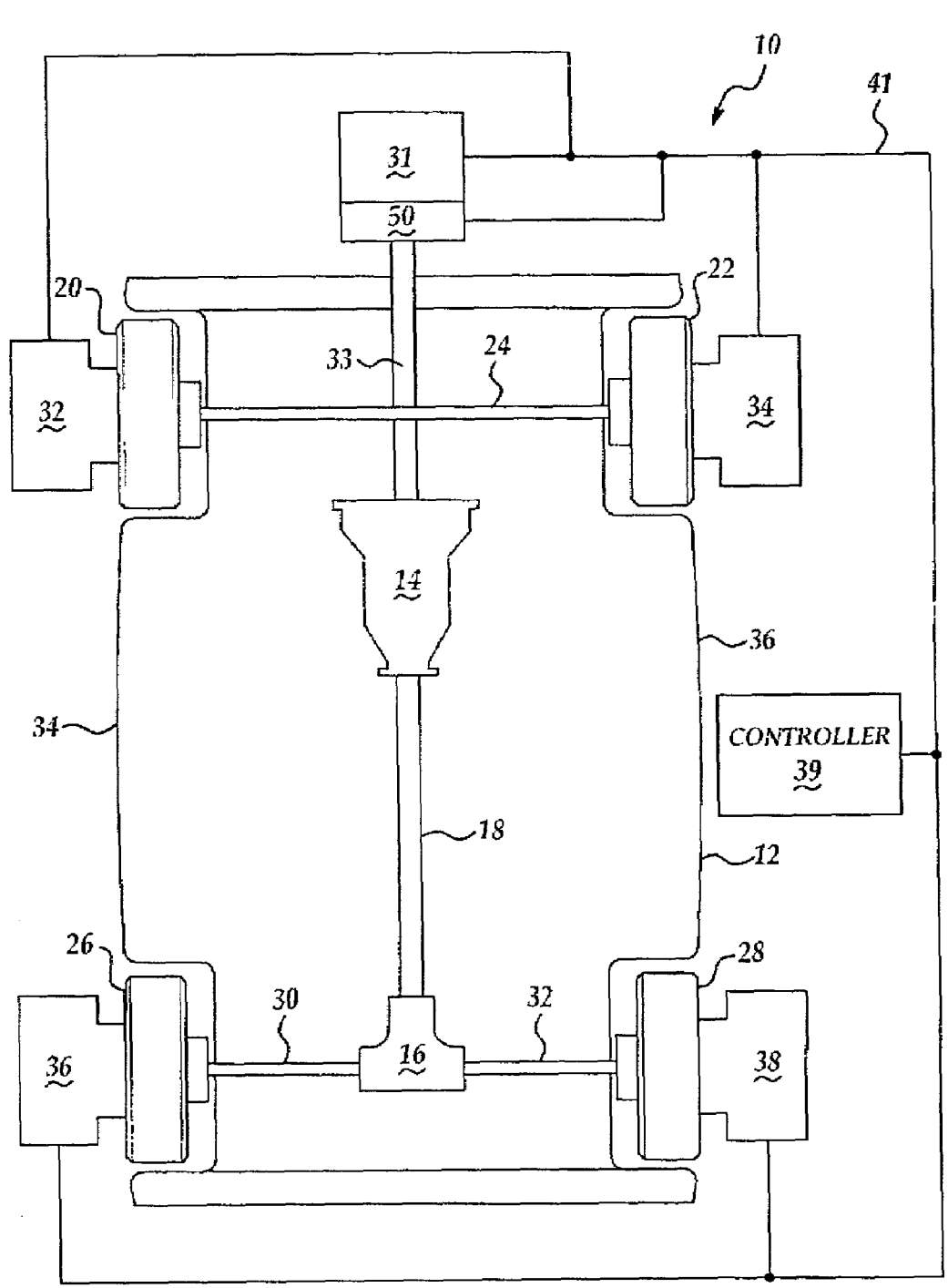
FIG. 1 is a block diagram of an apparatus for selectively and virtually designing and developing a vehicular damper which is made in accordance with the teachings of the preferred embodiment of the invention.
Figure 2A:
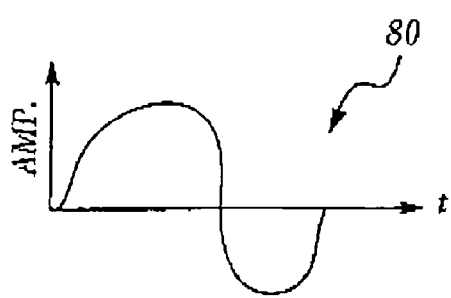
FIGS. 2(*a–f*) are graphical representations of various types of torque signals and some respective and associated frequency characteristics which may be generated and/or used by the apparatus of the preferred embodiment of the invention which is shown in FIG. 1.
Figure 2B:
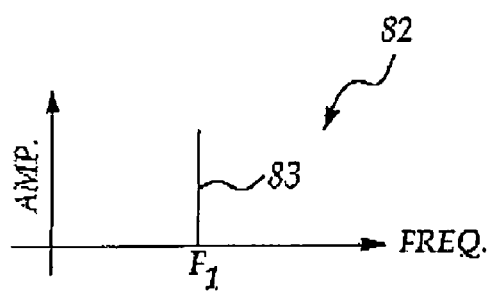
Figure 2C:
Figure 2D:
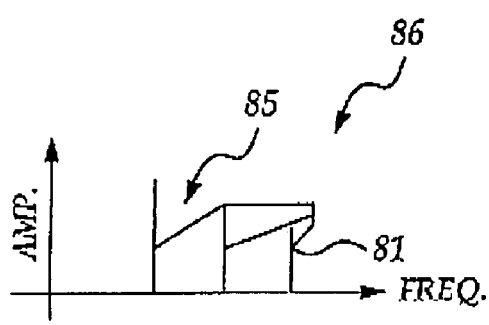
Figure 2E:
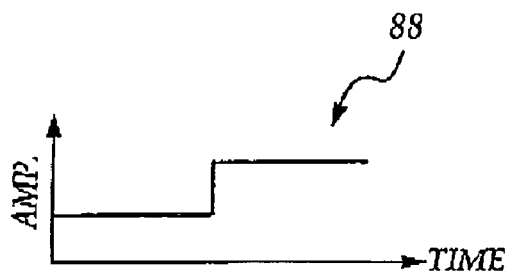
Figure 2F:
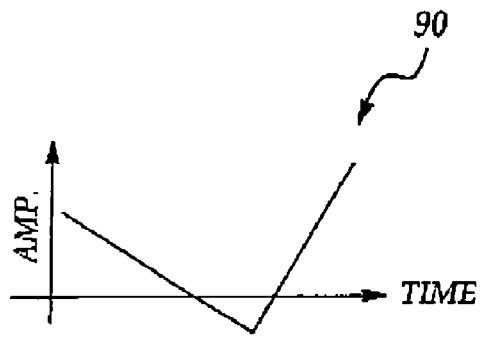

Referring now to FIG. 1, there is shown an apparatus 10 which is made in accordance with the teachings of the preferred embodiment of the invention in combination with a vehicle of the type having a transmission assembly 14, a differential assembly 16, a front axle 24, and a rear axles or "half shafts" 30, 32. Particularly, the differential assembly 16 is coupled to the transmission assembly 14 by a drivetrain or driveshaft assembly 18. The vehicle 12 further includes front wheels 20, 22 which are coupled to the front axle 24, and rear wheels 26, 28 which are respectively coupled to the differential assembly 16 by axles or "half-shafts" 30, 32. The vehicle further includes frame members 34, 36 which operatively receive axles 24, 30, and 32. It should be understood that while one type or configuration of vehicle is represented by the vehicle, other types of vehicles may be used in combination with the apparatus 10 and that nothing in this description is meant to limit the applicability of the present invention to a certain type of vehicle or to a vehicle having a certain type of torque generation configuration or assembly. It should be further appreciated that only the pertinent portions of the vehicle are shown in FIG. 1.

Particularly, apparatus 10 includes a torque generator 31 which, in one non-limiting embodiment of the invention, comprises a dynamometer which selectively provides variable amounts of torque which, in one non-limiting embodiment, simulates the torque which emanates from the internal combustion engine and which is coupled to the transmission assembly 14 by the use of shaft 33. Particularly, the torque may be provided in substantially any desired direction with respect to the longitudinal axis of symmetry of the shaft 33 and, in the most preferred embodiment of the invention, generator 31 provides torque having a pre-selected or programmable "amplitude and frequency".

The apparatus 10 further includes analyzers 32, 34, 36, and 38 which are operatively and respectively coupled to the wheels 20, 22, 26, and 28 and which selectively analyze or measure the amount of the noise and vibration which is respectively present upon or transmitted to these wheels 20, 22, 26, and 28. It should be appreciated that various numbers of such analyzers 32–38 may be utilized and these analyzers may be operatively placed at various locations of the vehicle in order to respectively measure certain vehicular attributes (i.e., the amount of noise and vibration which is present at their respective vehicular location. In this manner, as will be more readily seen from the following discussion, the analyzers 32, 34, 36 and 38 measure the noise and vibration caused by the communication of torque to the transmission assembly 14 and may be used to evaluate various damper designs and configurations. Moreover, it should be realized that analyzers 32, 34, 36 and 38 may each comprise a dynamometer, a vibration sensor assembly, or any other type of desired attribute sensing assembly.

Further, apparatus 10 includes a controller 39 which is operable under stored program control and which is physically and communicatively coupled to each of the analyzers 32, 34, 36 and 38 by the use of bus 41. The apparatus 10 also includes an actuator or a programmable and alternating signal generator 50, such as and without limitation a model 814 spinning torsional assembly which is available from the MTS Corporation of Minneapolis, Minn. which selectively provides alternating type signals (e.g., signals having a selectively alternating amplitude and frequency) and which may provide signals having a programmable frequency characteristic and therefore may comprise a programmable filter.

Particularly, the signal generator 50 is physically and controllably coupled to the controller 39 by the bus 41, is physically coupled to the transmission assembly 14 by the output shaft 33, and is coupled to the torque generator 31. The signal generator 50 therefore comprises a "virtual damper" which is coupled to the transmission assembly 14, which operates under the control of the controller 39 and which selectively "process" the virtual engine signals (e.g., the torque signals emanating from the torque provided 30) in substantially the same manner as an the actual vehicular damper. This "virtual damper" 50 therefore has a programmable frequency response characteristic or filtering characteristic which may be programmed or specified by the controller 39. The combination of the dynamometer 31 and the generator 50 thereby programmably produces signals which would otherwise emanate from a combination of an actual engine and an actual damper which are normally disposed within the vehicle 10 and such signals may be "selected" or specified by the controller 39. To understand the various types of torque signals, provided by a vehicular engine (by the torque producer 31) and their respective frequency characteristics, reference is now made to the graphs of FIG. 2.

That is, as is best shown by the graphs 80, 82, 84, 86, of FIGS. 2 (a–d), each unique type of torque signal has a unique type of frequency characteristic and the torque generator 31, of the present invention, may selectively provide substantially any type of desired torque signal and associated frequency characteristic, including but not limited to those set forth in FIGS. 2 (a–d). The signal generator 50, acting under the control of controller 39, may also programmably provide a frequency response or a frequency filter which is substantially similar to the frequency response associated with an actual damper and when combined with the signal emanating from the torque generator 31, produces a dampened torque signal which is substantially similar to that produced by an actual engine (i.e., one producing a torque signal which is substantially similar to the selected signal emanating from the torque generator 31) and by an actual damper (i.e., one having a frequency response at filtering characteristic which is substantially similar to that which is programmably or selectively produced by the torque generator 31.) Hence, different engines and dampers may be virtually modeled by selectively changing or modifying the signals produced by the torque generator 31 and by changing or modifying the frequency characteristic of the signal generator 50.

Figure 3:
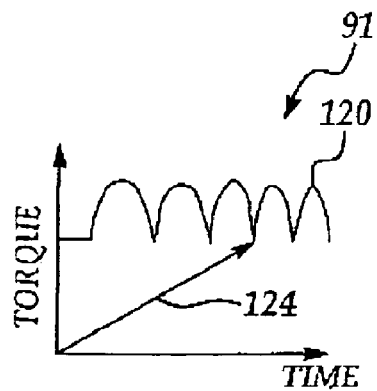
FIG. 3 is a graph illustrating a general type of a torque signal which may be generated by and /or used by the apparatus of the preferred embodiment of the invention.

For example, a sinusoidal type of torque signal, such as that shown in graph 80, has a "single dominant" type frequency signal or characteristic 83, such as shown in graph 82. A sinusoidal saw tooth type of torque signal such as that shown in graph 84, has a frequency signal characteristic 85 including multiple frequency "spikes" 81, such as shown in graph 86. A stepped type of torque signal, such as that shown in graph 88, and a "V" shaped torque signal, such as that shown in graph 90, are also non-limiting examples of the torque signals which may be generated by the dynamometer 50 and which also have respective and unique frequency characteristics. Hence, knowledge of the torque signal which is actually produced by an engine allows one to gain knowledge of the respective frequency characteristics or signals which are associated with that torque signal and which are needed to be produced by the engine/torque simulator. That is, as shown by graph 91 of FIG. 3, a torque signal has a certain amplitude 120 and a certain frequency or phase angle 124 and this frequency may be combined with a filter to produce a dampened signal.

Figure 4:
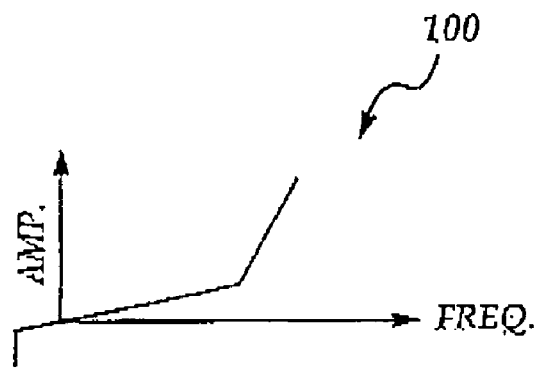
FIG. 4 is a graphical representation of the frequency response characteristics of a first type of vehicular damper which may be made in accordance with the teachings of the preferred embodiment of the invention.
Figure 5:
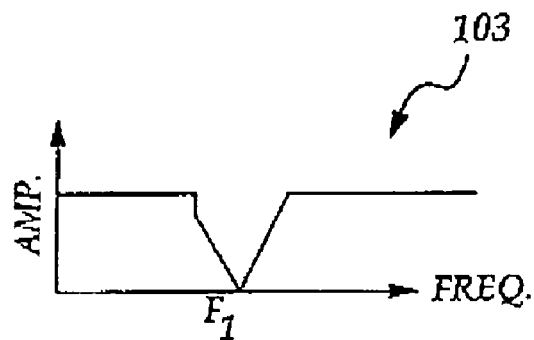
FIG. 5 is a graphical representation of the frequency response characteristics of a second type of vehicular damper which may be made in accordance with the teachings of the preferred embodiment of the invention.

As shown best in graphs 100 and 103 of FIGS. 4 and 5, the virtual damper or generator 31 also has a programmable frequency response characteristic or frequency filter which may form a series of interconnected segments (as in FIG. 4) a notch or null (as in FIG. 5), or substantially any other desired shape or characteristic.

Figure 6:
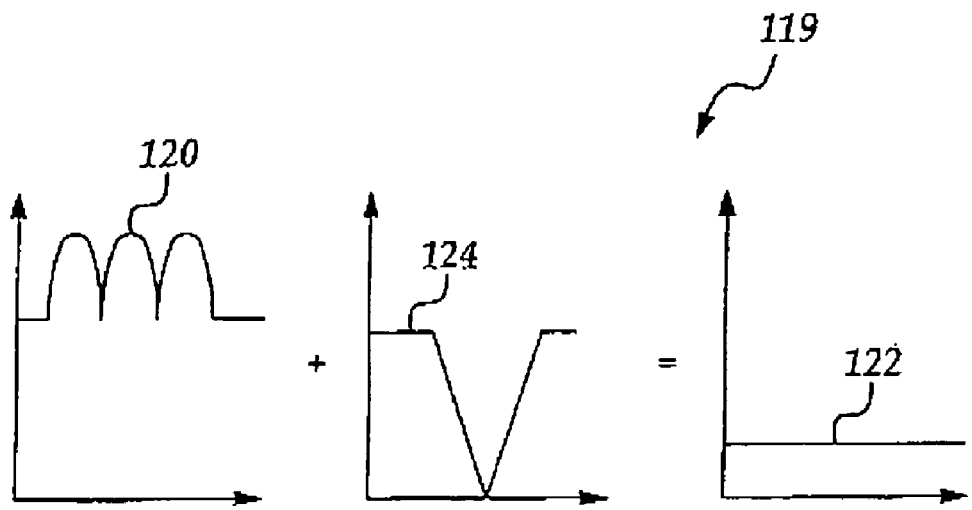
FIG. 6 is a graphical representation of the combination of a torque signal and a frequency filter according to the teachings of the preferred embodiment of the invention.

Hence, in actual vehicular operation, the complex torque signal, produced by an engine is typically communicated to a damper and then transferred to the transmission assembly 14. In the preferred embodiment of the invention, the torque signal is virtually constructed (e.g., without the use of an actual engine) by the engine simulator or torque generator 31 and the frequency response or filter is virtually constructed (e.g., without the use of an actual damper) by use of the signal generator 50. Particularly, the output signal, which is communicated to the transmission assembly 14 by the shaft 33, has a frequency characteristic which is represented by the sum of the frequency of the torque signal which is generated by the torque generator 31 and the programmed or frequency response characteristic or filter which is provided by the virtual damper 50. Measurement are made of the produced noise and vibration, by the analyzers 32–38, and the programmed frequency characteristic or filter is modified to reduce the measured noise and vibration. The frequency characteristic which desirably produces low or acceptable amounts of noise and vibration is then used to construct an actual damper. That is, an actual damper having frequency characteristics which are substantially identical to the desired frequency characteristic or filter is developed. A non-limiting combination of the torque and frequency response signals are shown in the graphs of FIG. 6 which graphically illustrates the manner in which a torque signal 120 may be selectively combined with a "null" frequency response or filter 124 to form a signal 122 which produces little noise and vibration.

It is to be understood that the invention is not limited to the exact construction and method which has been illustrated and discussed above, but that various changes and modifications may be made without departing from the spirit and the scope of the inventions as are more fully delineated in the following claims.

The invention claimed is:

1. A system for simulating torque transmission by a coupler, through which torque is transmitted between an engine and a transmission in the driveline of a motor vehicle, comprising:
    a torque generator that produces torque output signals having amplitude and frequency;
    a transmission;
    a signal generator driveably coupled to the torque generator and the transmission, for producing dampened variable torque output signals in response to the torque output signal produced by the torque generator and applying the dampened torque output signals to the transmission;
    multiple analyzers, each analyzer located at a discrete vehicle location, and measuring at said vehicle location a transient response induced by torque transmitted to the transmission by the signal generator; and
    a controller communicating with the torque generator, at least one analyzer and the signal generator, for commanding a frequency response from the signal generator to the torque signal produced by the torque generator, said frequency response simulating the amplitude and frequency of torque transients produced by the engine and transmitted to the transmission.

2. The system of claim 1 wherein the torque generator produces a variable torque amplitude and a variable torque frequency.

3. The system of claim 1 wherein said transient response comprises noise.

4. The system of claim 1 wherein said torque generator comprises at least one dynamometer.

5. The system of claim 1 wherein said signal generator has programmed frequency response characteristics.

6. The system of claim 1 wherein said signal generator is a rotating assembly.

7. The system of claim 1 wherein an analyzer measures noise at a vehicle location.

8. The system of claim 1 wherein an analyzer measures vibration at a vehicle location.

9. A method for simulating torque transmission through a coupler that connects an engine and a transmission in a driveline of a motor vehicle, comprising the steps of:
    (a) producing torque in a dynamometer having a magnitude and frequency;
    (b) driveably connecting the dynamometer to a signal generator;
    (c) operating the signal generator to produce a dampened variable torque in response to the torque produced by the dynamometer;
    (d) transmitting the torque produced by the signal generator to the driveline through the transmission;
    (e) measuring at a vehicle location a transient response induced by the torque transmitted to the driveline; and
    (f) commanding a frequency response from the signal generator to the torque signal produced by the torque generator, said frequency response simulating the amplitude and frequency of torque transients produced by the engine and transmitted to the transmission.

10. The method of claim 9 wherein step (d) further comprises measuring vibration at the vehicle location.

11. The method of claim 9 wherein step (d) further comprises measuring noise at the vehicle location.

12. The method of claim 9 wherein step (d) further comprises measuring vibration at a wheel assembly.

13. The method of claim 9 wherein step (c) further comprises:
    using a controller communicating with the dynamometer and the signal generator to vary the magnitude of torque transmitted to the driveline.

14. The method of claim 9 wherein step (c) further comprises:
    using a controller communicating with the dynamometer and the signal generator to vary the frequency of torque transmitted to the driveline.

* * * * *